United States Patent [19]
Rangabe

[11] 3,945,647
[45] Mar. 23, 1976

[54] CLEANING GRAMOPHONE RECORDS

[76] Inventor: Alexander R. Rangabe, 'Stoneacre', Denmead, Portsmouth, Hampshire, England

[22] Filed: Oct. 4, 1974

[21] Appl. No.: 512,042

[30] Foreign Application Priority Data
Oct. 4, 1973 United Kingdom............... 46406/73
Aug. 21, 1974 United Kingdom............... 36717/74

[52] U.S. Cl................. 274/47; 15/1.5 R; 15/256.5
[51] Int. Cl.²..................... G11B 3/58; A47L 13/40
[58] Field of Search.......... 15/1.5, 97 R, 246, 256.5, 15/256.51, 256.53, 256.52; 274/47

[56] References Cited
UNITED STATES PATENTS
| | | | |
|---|---|---|---|
| 1,335,352 | 3/1920 | Slowey................................ | 274/47 |
| 2,310,275 | 2/1943 | Beebe.................................. | 274/47 |
| 2,322,986 | 6/1943 | Weiss et al......................... | 15/1.5 |
| 3,781,107 | 12/1973 | Ruhland....................... | 15/256.53 X |
| 3,847,480 | 11/1974 | Fisher......................... | 15/256.53 X |

*Primary Examiner*—Edward L. Roberts
*Attorney, Agent, or Firm*—Wolfe, Hubbard, Leydig, Voit & Osann, Ltd.

[57] ABSTRACT

A device for cleaning a gramophone record while the record is being played comprises an endless belt arranged to carry an electrostatic charge and mounted so as to extend generally radially of the record, with a lower run of the belt in contact with the record surface. During rotation of the record the belt gathers and removes dust and other particles from the record surface, the particles being retained on the belt by the electrostatic charge. The belt is driven by rotation of the record to transport the particles to a position remote from the record surface, the particles being removed from the belt at this position.

15 Claims, 4 Drawing Figures

3,945,647

CLEANING GRAMOPHONE RECORDS

BACKGROUND OF THE INVENTION

1. Field of the present invention

The present invention relates to a device for cleaning a gramophone record during play.

2. Description of the Prior Art

There has been proposed a record cleaning device in the form of a pivoted arm carrying at its outer extremity a weighted non-rotatable roller, covered with a synthetic velvet fabric. In operation, the roller is placed on the record with its longitudinal axis arranged approximately radially to the record, so that the staples of the fabric extend into the grooves and the roller transverses the record at a rate determined by the groove pitch.

With this previously proposed device, a proportion of the small dust particles removed from the grooves, and also some larger lint and other particles on the surface, tend to work their way past the staples of the roller to remain on the record surface, and may be picked up by the stylus thus contaminating the stylus. This combination is liable to get worse as the roller gets increasingly clogged with dust.

SUMMARY OF THE INVENTION

According to the present invention, there is provided a device for cleaning a gramophone record, comprising an endless belt arranged to carry an electrostatic charge, means for mounting the belt such that the belt touches the record surface, and gathers and removes particles from the surface during rotation of the record, means for driving the belt whereby to transport the removed particles away from the record surface and means for removing the particles from the belt.

BRIEF DESCRIPTION OF THE DRAWINGS

An embodiment of the invention, will now be described, by way of example only, with reference to the accompanying diagrammatic drawings, in which.

DESCRIPTION OF THE PREFERRED EMBODIMENT

Figure 1:
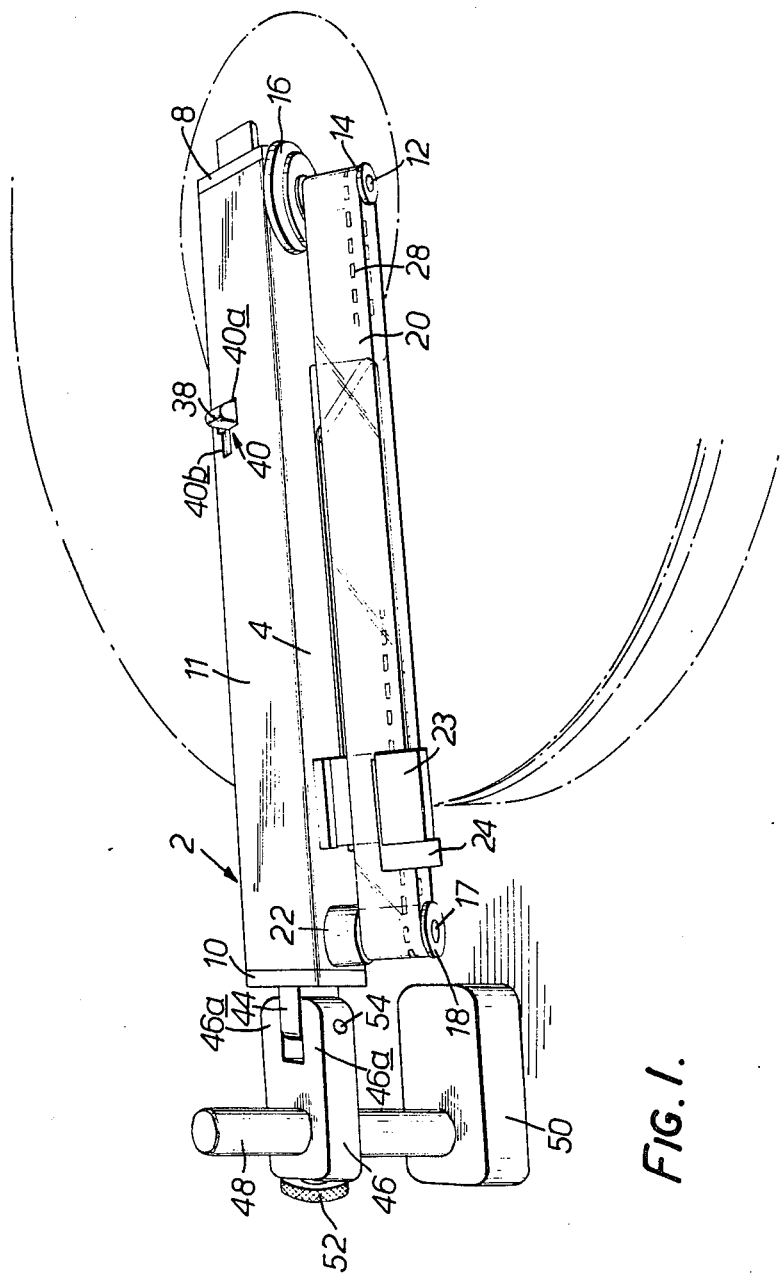
FIG. 1 is a perspective view of a record cleaning device in accordance with the present invention.
Figure 2:
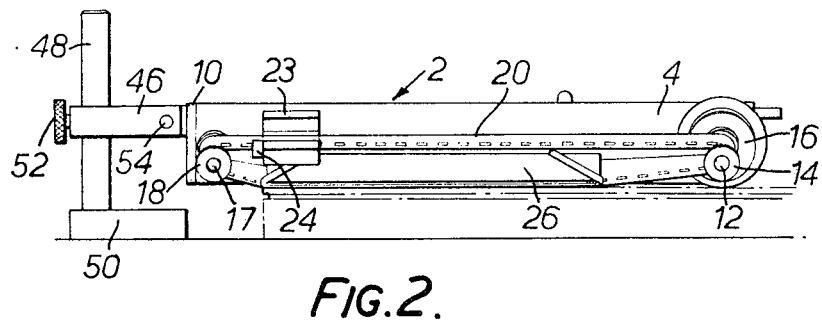
FIG. 2 is a front elevation of the device.
Figure 3:
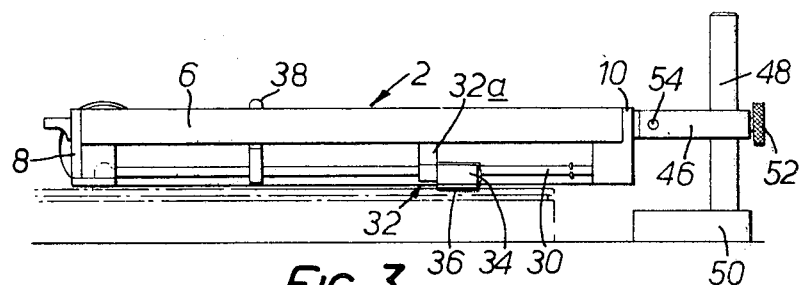
FIG. 3 is a rear elevation of the device.
Figure 4:
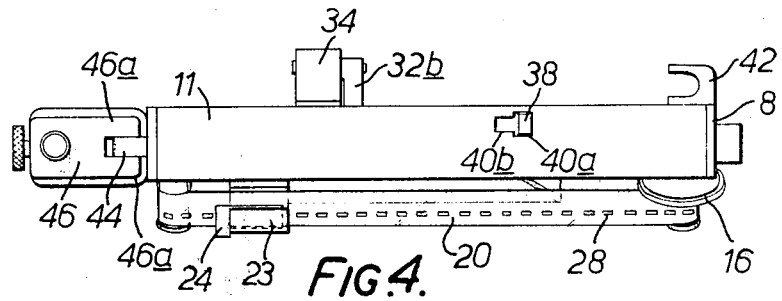
FIG. 4 is a plan view of the device.

The cleaning device shown in the drawings comprises support means in the form of an elongate frame 2 having a front wall 4, a rear wall 6, opposed end walls 8, 10 and an upper wall 11; the front wall 4 faces downwardly with the lower edge of the wall 4 lying at a lower level than that of the rear wall 6. Preferably, the front, rear, and upper walls of the frame 2 are formed in one piece from aluminium or other suitable sheet material and the end walls 8, 10 are formed by moulded plastics blocks.

A spindle 12 projects forwardly from the front wall 4 of the frame 2, the rear end of the spindle 12 being anchored in the end wall 8; the spindle 12 extends perpendicularly to the front wall 4 and is inclined downwardly preferably at an angle of about 30° to the horizontal. A roller 14 rigid with a rubber or rubber-tyred wheel 16 is journalled on the spindle 12, the roller 14 being located forwardly of the wheel 16. The lower edge of the wheel 16 extends slightly beneath the lower edge of the frame 2 to enable the wheel to be driven by contact with the record to be cleaned, as will be described hereinafter.

A second spindle 17 parallel to the spindle 12, is located at the other end of the frame 2 and supports a roller 18. An endless belt 20, driven by the wheel 16 and arranged to clean the playing surface of the record, extends between the rollers 14 and 18. The spindle 17 is mounted at its rear end in a block 22 which is supported by a shaft which is journalled in the end wall 10 of the frame, the shaft extending between the end wall 10 and the block 22. This shaft is eccentric with respect to the spindle 17 and is biased by a torsion spring (not shown) in a sense to move the spindle 17 away from the spindle 12; in this manner, the belt 20 is placed under a slight tension. Preferably, the rollers 14 and 18 are composed of rubber or a plastics material.

The belt 20 is composed of an insulating material capable of being charged to a high electrostatic potential by friction, and may be formed of polyvynil chloride, polypropylene or other suitable plastics film. Preferably, the belt is about 12mm wide and about 0.05 to 0.10mm in thickness.

A holder 23 is mounted on the front wall 4 of the frame 2 adjacent the upper run of the belt 20 and carries a replaceable friction pad 24. Preferably, the pad 24 is formed from a relatively stiff flock-sprayed paper which is folded flock-side inwards. The paper is placed over the upper run of the belt 20 with the opposed flocked surfaces lying respectively above and below the upper and lower surfaces of the belt, and the paper is slid into position in the holder 23 with the flocked surfaces in light rubbing contact with the upper and lower surfaces of the belt.

An elongate pressure plate 26 is pivotally mounted on the front wall 4 of the frame 2 above the lower run of the belt 20 and acts to bias the lower run of the belt 20 downwardly so that its leading edge is maintained in light contact with the surface of the record during play, whilst contact between the lower edges and the rollers 14, 18 and the record surface is avoided. The pressure plate 26 is mounted on the front wall 4 of the frame 2 by hinge means of any suitable construction; the detailed construction of the hinge means forms no part of the invention and a suitable construction will be readily apparent to those skilled in the art. In the arrangement shown, the plate 26 is biased downwardly by gravity; in an alternative arrangement the plate 26 may be spring biased.

In order to substantially reduce the level of noise generated by the rubbing action between the leading edge of the lower run of the belt 20 and the record surface, the belt 20 is advantageously perforated with a series of elongate slits or narrow slots 28 arranged close to, and parallel with, the leading edge of the belt 20. The slits 28 act to de-couple the greater part of the belt area from the leading edge portion thereof.

A rod 30 extends longitudinally between the end walls 8, 10, the end portions of the rod 30 being mounted in a vertical slot in each end wall 8, 10 to enable the rod 30 to be raised and lowered over a limited distance with respect to the frame 2. A slide member 32 slidable along the rod 30 is in the form of a cranked lever having an upwardly-directed arm 32a which engages the inner surface of the rear wall 6, and an outwardly-directed arm 32b extending rearwardly beneath the lower edge of the rear wall 6 and carrying a metal or plastics support block 34 which is pivotal over a limited angular distance. A pad 36, for cleaning the grooves of the record, is cemented to the underside of the block 34. Preferably, the pad 36 is composed of a synthetic velvet-type fabric having very short, packed, staples for example 0.5mm long, and 12 to 15 microns in diameter, the pad 36 preferably having a surface area of about 2cm$^2$; the pad 36 may be square, rectangular, or other suitable shape. Advantageously, the staples are permanently set at an acute leading angle, for example 45°, in the tangential direction of the groove.

When the rod 30 is in a lower position in which the end portions of the rod are supported by the bottom edges of the vertical slots in the walls 8, 10, the pad 36 engages the surface of the record. The weight of the block 34 is chosen to provide the correct operating pressure for the pad 36; this pressure should be sufficient to ensure that a large proportion of the staples make contact with the bottom of the grooves, but should not be so high as to appreciably deflect the grooves due to the effects of friction between the staples and the moving record surface.

The rod 30 carries an upwardly-directed control member 38 which extends through a longitudinal slot 40 in the upper wall 11 of the frame 2, the slot having a portion 40a of enlarged width, and a portion 40b of reduced width. The control member 38 has a head portion arranged above a shank portion of reduced cross-section; when the rod 30 is in its lower position, the head portion of the control member 38 extends through the portion 40a of the slot 40. By lifting the head portion so that the shank portion is aligned with the slot and by moving the control member 38 towards the reduced portion 40b, the rod 30 will be raised with the result that the pad 36 is removed from the record surface, the head portion resting on the upper wall 11 at either side of the reduced portion 40b of the slot 40 in order to hold the rod 30 in its raised position.

The end wall 8 of the frame 2 includes an integral lug 42 having an aperture arranged to receive the spindle of a gramophone record turntable. The other end wall 10 of the frame 2 includes an integral lug 44 which engages a support bracket 46. The support bracket 46 is movable along a vertical column 48 mounted at its lower end in a base 50 secured to the base plate of the turntable; the bracket 46 can be held at a selected position along the column 48 by tightening a knurled screw 52 carried by the bracket 46. The bracket 46 is bifurcated to form two opposed arms 46a, a horizontal pin 54 extending between the arms 46a. The lug 44 of the end wall 10 is positioned between the arms 46a and has a recess which receives the pin, the pin thus supporting the frame 2 for pivotal movement between a horizontal operative position, and an inoperative position in which the frame 2 is swung clear of the record and is supported in a generally vertical position on the bracket 46.

In use of the device, the frame 2 is located above a record on the turntable, with the lug 42 engaging the center spindle of the turntable, and the drive wheel 16 resting on the label in the central portion of the record. The frame 2 is supported at its other end by the bracket 46, via the lug 44, the bracket 46 being positioned so that the rod 30 extends parallel to the surface of the record. In this configuration the rod 30 and the belt 20 will extend approximately radially of the record, and the leading edge of the lower run of the belt 20, which is inclined at an angle of about 30° to the horizontal, is biased by the pressure plate 26 into light contact with the surface of the record over a length which encompasses the lead-in grooves, the recorded section, and the run-out.

Rotation of the record drives the wheel 16, which, in turn, drives the belt 20.

Movement of the belt 20 relative to the friction pad 24 causes a high static charge to be imparted to the surface of the belt 20. Dust, lint and other particles on the record surface are gathered mechanically by the leading edge of the lower run of the belt 20 in contact with the record, the belt acting in the manner of a snowplough. The particles move onto the adjacent top surface of the belt and are retained thereon by the electrostatic charge, to be carried by the belt to the pad 24. Upon reaching the pad 24, the large particles will be held by the leading edge of the pad 24, and a proportion will eventually fall from the pad 24 clear of the record. Smaller lint and fine dust particles which move past the leading edge of the pad 24 are trapped by the flock.

The slide member 32 carrying the pad 36 is located at the end of the rod 30 adjacent the end wall 10, and the control member 38 is moved into the enlarged portion 40a of the slot 40 to permit the rod 30 to move into its lowered position and the pad 36 to contact the outer portion of the record surface. Due to the intimate contact between the pad 36 and the record grooves, the pad 36 cleans the grooves and traverses the record radially inwardly, the pad being guided by movement of the slide member 32 along the rod 30.

During use of the pad 36, dust particles within the grooves gradually move through the pad in the direction of rotation. Eventually, a proportion of them escape from the trailing edge of the pad at or near the record surface, sometimes in the form of bunched agglomerates. At the next revolution, these are collected and removed by the belt 20 as described above.

Although a pad with substantially vertical staples may deal effectively with dust particles resting loosely in the grooves, such stamples tend to ride over any particles which are firmly lodged in the grooves or attached to the groove walls. The preferred form of pad incorporating inclined staples as described earlier, tend to "plough" through the grooves to dislodge these particles.

With a pad 1.5cm × 1.5cm square, even with heavily contaminated grooves, it has been found that the majority of the dust and other particles is dislodged by the staples within the front (as considered in the direction of movement of the pad across the record) quarter of the pad, and that most of the area of the pad nearest the outside of the record remains substantially clean, up to the end of play. Thus, by arranging for the cartridge stylus to track at a radius near that of the outside edge of the pad, it will always be tracking a portion of the record free both from surface and groove contamination.

Although in the device particularly described, the pad 24 serves both to charge the belt and to remove particles therefrom, separate elements can be used for each of these functions.

If desired, the electrostatic belt may be used on its own to remove surface dust from the record. Alternatively, it may be combined with any other suitable form of integral, or separate, groove cleaning device.

In a further alternative arrangement, instead of using a frictionally charged belt, a belt of permanently charged electret material may be used for surface dust collection.

I claim:

1. In a device for cleaning a gramophone record, support means arranged to extend generally radially of the record, an endless belt arranged to carry an electrostatic charge, the belt having a lower run with a leading edge and a trailing edge, the belt being mounted on the support means such that the lower run of the belt extends generally radially of the record and contacts the record to collect dust and other particles from the record surface during rotation of the record, drive means mounted on the support means to drive the belt, the drive means engaging the record in order to drive the belt from rotation of the record, and means for removing from the belt, dust and other particles collected from the record surface.

2. A device according to claim 1, further comprising rollers, said rollers being mounted on the support means, and the belt being entrained around the rollers, and wherein the drive means comprises a drive wheel, said drive wheel engaging the central portion of the record and being fast for rotation with at least one of the rollers.

3. A device according to claim 1, wherein the trailing edge of the lower run of the belt is located at a higher level than the said leading edge.

4. A device according to claim 3, further comprising means biasing the leading edge portion of the lower run of the belt into contact with the record surface.

5. A device according to claim 1, wherein the belt comprises means defining a perforated zone separating the leading edge portion of the belt from the remainder of the belt.

6. A device according to claim 1, wherein the said means for removing particles from the belt comprises a pad, said pad contacting the belt at a position remote from the lower run.

7. A device according to claim 6, wherein said pad is operative to charge the belt by friction.

8. A device according to claim 1 further comprising a guide, said guide being mounted on the support means to extend generally radially of the record, and cleaning means for the grooves of the record, said cleaning means being mounted for movement along the guide.

9. A device according to claim 8, wherein the cleaning means trails the belt in the direction of record rotation and comprises a pad, said pad being biased for contact with the grooves, and including fibers, said fibers being arranged to enter the grooves.

10. A device according to claim 9, wherein the fibers are permanently set so as to lie at a leading acute angle with respect to the record surface.

11. In a device for cleaning a gramophone record on a turntable, an elongate frame having opposed end portions, a wheel mounted at one of said end portions of the frame, the wheel engaging a central portion of the record to support the said one end portion of the frame and being driven from rotation of the record, a support member located in a stationary position externally of the record to support the other of said end portions of the frame, roller means at each end portion of the frame, the roller means at the said one end portion of the frame being fast for rotation with the wheel, an endless belt having a leading edge, said belt being entrained around the roller means, and the belt being driven by the roller means at the said one end portion of the frame along an endless path having an upper run and a lower run, the leading edge of the belt contacting the playing surface of the record along the lower run of the path, and the belt carrying a charge such that particles gathered from the playing surface of the record by the leading edge of the belt are retained on the belt and are transported by movement of the belt from the lower run of the path to the upper run of the path, and means adjacent the upper run of the path to remove the said particles from the belt.

12. A device according to claim 1, further comprising belt-charging means located in a stationary position on the path of movement of the belt, said charging means engaging the belt to frictionally charge the belt during movement thereof.

13. In a device for cleaning a gramophone record carried by a rotatable means to constitute therewith a rotatable assembly, a support member located in a position externally of the assembly, support means mounted by the support member to extend across and above the surface of the record, an endless belt arranged to carry an electrostatic charge, the belt having a lower run with a leading edge and a trailing edge, the belt being mounted on the support means such that the lower run of the belt extends generally radially of the record and contacts the surface of the record to collect dust and other particles from the record surface during rotation of the record, drive means mounted on the support means to drive the belt, the drive means engaging the assembly in the operative position of the support means to drive the belt from rotation of the assembly, and means for removing from the belt, dust and other particles collected from the record surface.

14. A device according to claim 13, further comprising belt-charging means located in a stationary position on the path of movement of the belt, said charging means engaging the belt to frictionally charge the belt during movement thereof.

15. In a device for cleaning a gramophone record placed on a turntable by rotation about a vertical axis, a support member located in a position externally of the turntable, support means mounted by the support member for movement relative to the support member between an operative position in which it extends across and above the surface of the record and an inoperative position in which it is remote from the record whereby to permit removal of the record from the turntable, an endless belt arranged to carry an electrostatic charge, the belt having a lower run with a leading edge and a trailing edge, the belt being mounted on the support means such that in the operative position of the support means, the lower run of the belt is substantially horizontal and extends generally radially of the record, and the leading edge of the belt contacts the record surface to gather and collect dust and other particles from the record surface, drive means operative to drive the belt during rotation of the record, and means for moving from the belt dust and other particles collected from the record surface.

* * * * *